US012372051B2

(12) United States Patent
Ogawa

(10) Patent No.: US 12,372,051 B2
(45) Date of Patent: Jul. 29, 2025

(54) FUEL PUMP

(71) Applicant: MITSUBISHI HEAVY INDUSTRIES ENGINE & TURBOCHARGER, LTD., Sagamihara (JP)

(72) Inventor: Hisao Ogawa, Kanagawa (JP)

(73) Assignee: MITSUBISHI HEAVY INDUSTRIES ENGINE TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/562,697

(22) PCT Filed: May 30, 2022

(86) PCT No.: PCT/JP2022/021942
§ 371 (c)(1),
(2) Date: Nov. 20, 2023

(87) PCT Pub. No.: WO2023/281938
PCT Pub. Date: Jan. 12, 2023

(65) Prior Publication Data

US 2024/0247629 A1 Jul. 25, 2024

(30) Foreign Application Priority Data

Jul. 6, 2021 (JP) ................................ 2021-112247

(51) Int. Cl.
*F02M 59/44* (2006.01)
*F02M 59/10* (2006.01)
*F02M 59/48* (2006.01)

(52) U.S. Cl.
CPC .......... *F02M 59/44* (2013.01); *F02M 59/102* (2013.01); *F02M 59/48* (2013.01)

(58) Field of Classification Search
CPC ...... F02M 59/02; F02M 59/102; F02M 59/44; F02M 59/48; F02M 59/485
See application file for complete search history.

(56) References Cited

U.S. PATENT DOCUMENTS 2,101,221 A * 12/1937 Orange .................. F02M 59/26 417/494
2,421,899 A * 6/1947 Messner ................ F02M 59/44 92/129

(Continued)

FOREIGN PATENT DOCUMENTS

CN 105952561 A * 9/2016 ........... F02M 59/102
CN 205744225 U 11/2016

(Continued)

OTHER PUBLICATIONS

Written Opinion of the International Searching Authority for International Application No. PCT/JP2022/021942, dated Aug. 16, 2022, with English translation.

(Continued)

*Primary Examiner* — John M Zaleskas
(74) *Attorney, Agent, or Firm* — BIRCH, STEWART, KOLASCH & BIRCH, LLP

(57) ABSTRACT

Provided is a fuel pump including: a pump head (23); a plunger barrel (32) in which a support hole (38) is provided, and one end section of which in the axial direction of the support hole (38) is screw-fastened into the pump head (23); a plunger (41) that is supported in the support hole (38) so as to be freely movable in the axial direction; a pressurization chamber (56) that is defined by one end of the support hole (38) and one end of the plunger (41); a fuel discharge passage (73) one end of which communicates with the pressurization chamber (56); and a fuel suction passage (70) one end of which communicates with the pressurization chamber (56).

17 Claims, 4 Drawing Sheets

(56) References Cited

U.S. PATENT DOCUMENTS

| | | | | | |
|---|---|---|---|---|---|
| 2,537,087 | A * | 1/1951 | Pyk | F02M 59/34 239/533.5 |
| 3,667,437 | A * | 6/1972 | Dreisin | F02M 59/44 123/495 |
| 3,945,773 | A * | 3/1976 | Vuaille | F02M 59/485 417/494 |
| 10,995,718 | B2 | 5/2021 | Mercer et al. | |
| 2011/0253109 | A1* | 10/2011 | Usui | F02M 39/02 123/509 |
| 2013/0104730 | A1* | 5/2013 | Maier | F02M 59/102 92/61 |
| 2016/0273532 | A1* | 9/2016 | Sassnick | F04B 9/042 |
| 2018/0171992 | A1* | 6/2018 | Saito | F02M 55/04 |
| 2020/0049116 | A1* | 2/2020 | Tokumaru | F04B 53/168 |
| 2020/0325868 | A1* | 10/2020 | Mercer | F02M 59/485 |
| 2023/0383716 | A1* | 11/2023 | Garland | F02M 59/442 |
| 2024/0247628 | A1* | 7/2024 | Kato | F04B 1/0421 |
| 2024/0295203 | A1* | 9/2024 | Ogawa | F04B 53/16 |

FOREIGN PATENT DOCUMENTS

| | | | | |
|---|---|---|---|---|
| DE | 10322603 | A1 * | 12/2004 | F02M 55/004 |
| DE | 102010043963 | A1 * | 5/2012 | F02M 59/44 |
| DE | 102014218488 | A1 * | 3/2016 | C23C 8/24 |
| JP | 7-269461 | A | 10/1995 | |
| JP | 2003065175 | A * | 3/2003 | F04B 1/0404 |
| JP | 2006-183647 | A | 7/2006 | |
| JP | 2010-229898 | A | 10/2010 | |
| KR | 10-2018-0134925 | A | 12/2018 | |
| WO | WO 2006/070719 | A1 | 7/2006 | |
| WO | WO-2015183278 | A1 * | 12/2015 | F02M 59/462 |
| WO | WO 2018/224624 | A1 | 12/2018 | |
| WO | WO-2020166114 | A1 * | 8/2020 | |
| WO | WO-2021088324 | A1 * | 5/2021 | F02M 53/00 |

OTHER PUBLICATIONS

Extended European Search Report for European Application No. 22837359.3, dated Oct. 2, 2024.

* cited by examiner

FUEL PUMP

TECHNICAL FIELD

The present disclosure relates to a fuel pump applied to an internal combustion engine.

BACKGROUND ART

For example, a common-rail-type fuel injection device applied to a diesel engine includes a fuel pump, a common rail, and a fuel injector. The fuel pump inhales fuel from a fuel tank, pressurizes the fuel, and supplies the fuel to the common rail as high-pressure fuel. The common rail holds the high-pressure fuel supplied from the fuel pump at a predetermined pressure. The fuel injector injects the high-pressure fuel of the common rail into a combustion chamber of the diesel engine by opening and closing the injector. The fuel pump includes plunger barrels, plungers, suction valves, and discharge valves. In a case where the plunger moves inside the plunger barrel in one direction, the suction valve is opened and the fuel is inhaled into the pressurization chamber. In a case where the plunger moves inside the plunger barrel in the other direction, the fuel in the pressurization chamber is pressurized, and the discharge valve is opened to discharge the high-pressure fuel. Examples of such a fuel pump include a fuel pump described in PTL 1 below.

CITATION LIST

Patent Literature

[PTL 1] Japanese Unexamined Patent Application Publication No. 2010-229898

SUMMARY OF INVENTION

Technical Problem

The fuel pump inhales low-pressure fuel into the pressurization chamber by reciprocating of the plunger, and discharges pressurized high-pressure fuel. The plunger is movably supported by a support hole provided in the plunger barrel, and the pressurization chamber is provided at an end portion of the support hole. Since the pressurization chamber holds the high-pressure fuel, a highly accurate clearance is required between the plunger and the support hole. In addition, since the plunger moves in the support hole at high speed and under high-pressure conditions, high reliability against burn-in is also required.

In the related art, the plunger barrel is bolt-fastened to a pump body. In this case, the plunger barrel is fastened to the pump body by screwing a plurality of bolts penetrating the pump body with a contact portion with the pump body in the plunger barrel. In this structure, it is necessary to arrange a large number of bolts on the pump body side, and it is necessary to dispose a large number of bolts so as not to interfere with other fixing bolts. For this reason, a space for fastening the plurality of bolts is required on the barrel side, and an outer diameter of the plunger barrel is increased. This causes a problem that a size of the fuel pump is increased. Further, the plunger barrel may be elastically deformed due to non-uniformity of fastening force of the plurality of bolts, and roundness of the support hole may decrease.

The present disclosure has been made to solve the above-described problems, and an object of the present disclosure is to provide a fuel pump for reducing a size of the entire device by reducing a diameter of a plunger barrel.

Solution to Problem

In order to achieve the above object, according to the present disclosure, there is provided a fuel pump including: a pump head; a plunger barrel that is provided with a support hole and in which one end portion side of the support hole in an axial direction is screwed to the pump head; a plunger that is supported by the support hole so as to be movable along the axial direction; a pressurization chamber partitioned by one end portion of the support hole and one end portion of the plunger; a fuel discharge channel of which one end portion communicates with the pressurization chamber; and a fuel suction channel of which one end portion communicates with the pressurization chamber.

Advantageous Effects of Invention

According to the fuel pump of the present disclosure, it is possible to reduce a size of the entire device by reducing a diameter of the plunger barrel.

DESCRIPTION OF EMBODIMENTS

Hereinafter, a preferred embodiment of the present disclosure will be described in detail with reference to the drawings. The present disclosure is not limited by the embodiment, and in a case where there are a plurality of embodiments, the present disclosure also includes a configuration in which the respective embodiments are combined with each other. In addition, components in the embodiment include components that can be easily assumed by those skilled in the art, components that are substantially the same, or components that fall within an equivalent range.

<Fuel Injection Device>

Figure 1:
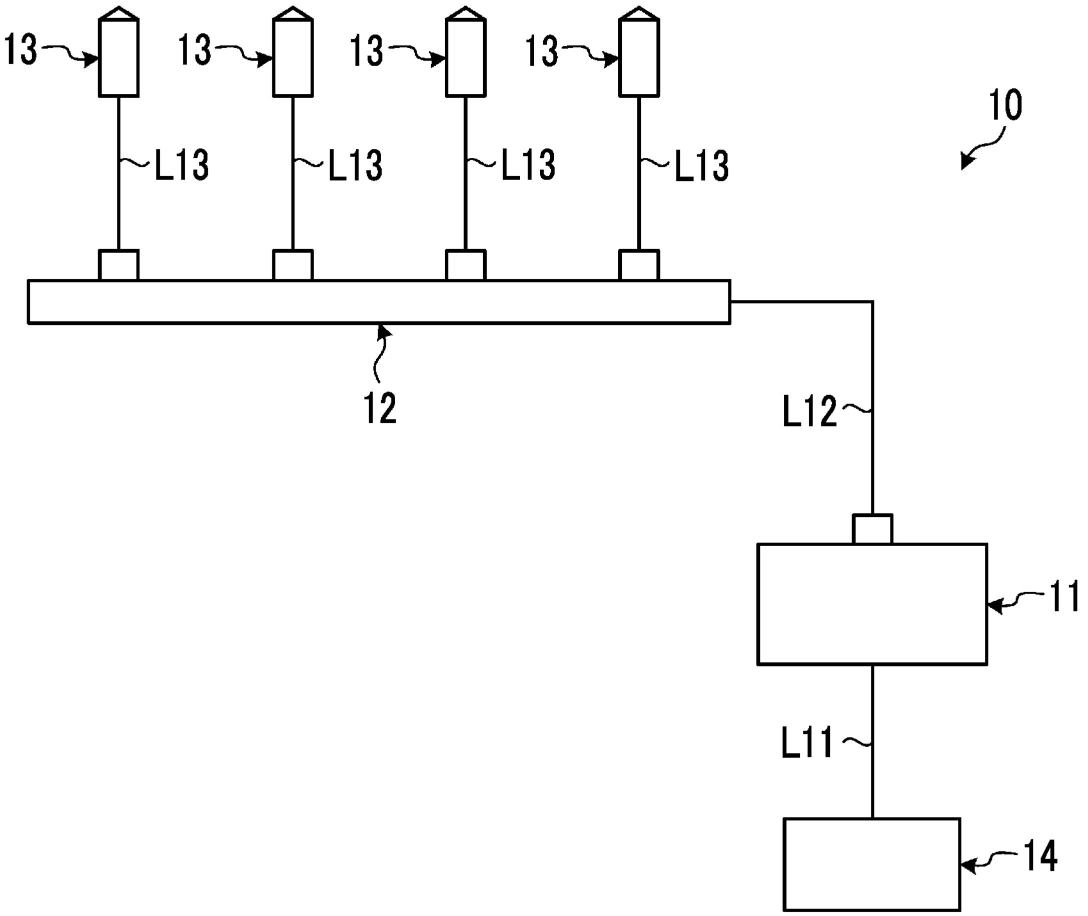
FIG. 1 is a schematic configuration diagram illustrating a fuel injection device of the present embodiment.

FIG. 1 is a schematic configuration diagram illustrating a fuel injection device of the present embodiment.

As illustrated in FIG. 1, the fuel injection device 10 is mounted on a diesel engine (internal combustion engine). The fuel injection device 10 includes a fuel pump 11, a common rail 12, and a plurality of fuel injectors 13.

A fuel tank 14 is connected to the fuel pump 11 via a fuel line L11. The fuel pump 11 inhales the fuel stored in the fuel tank 14 from the fuel line L11, and pressurizes the fuel to generate high-pressure fuel. The common rail 12 is connected to the fuel pump 11 via a high-pressure fuel line L12. The common rail 12 holds the high-pressure fuel supplied from the fuel pump 11 at a predetermined pressure. The fuel injectors 13 are respectively connected to the common rail 12 via a plurality of (in the present embodiment, four) fuel supply lines L13. The fuel injector 13 injects the high-pressure fuel of the common rail 12 into each cylinder (combustion chamber) of the diesel engine by opening and closing the injector.

<Fuel Pump>

Figure 2:
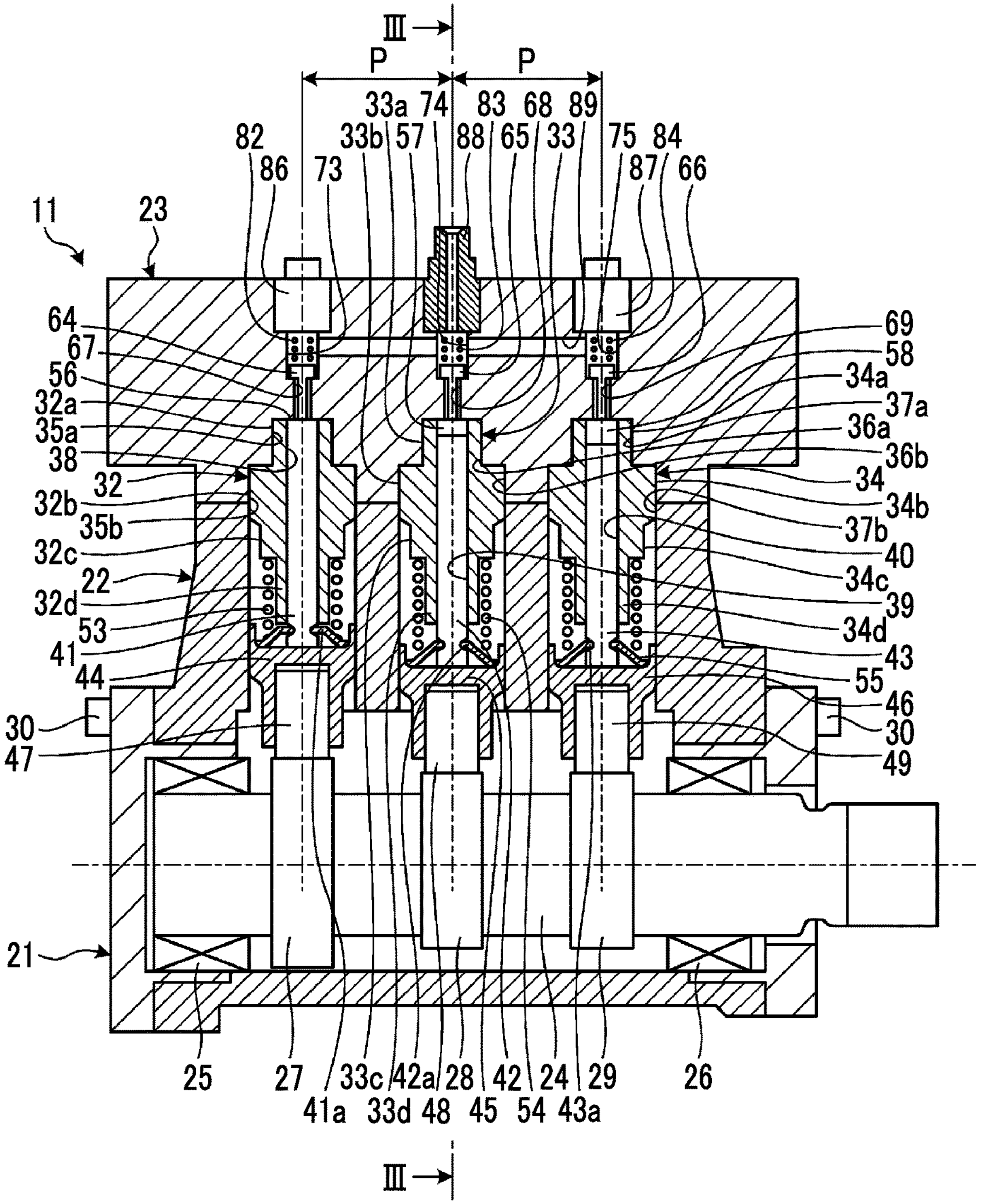
FIG. 2 is a vertical sectional view illustrating a fuel pump of the present embodiment.
Figure 3:
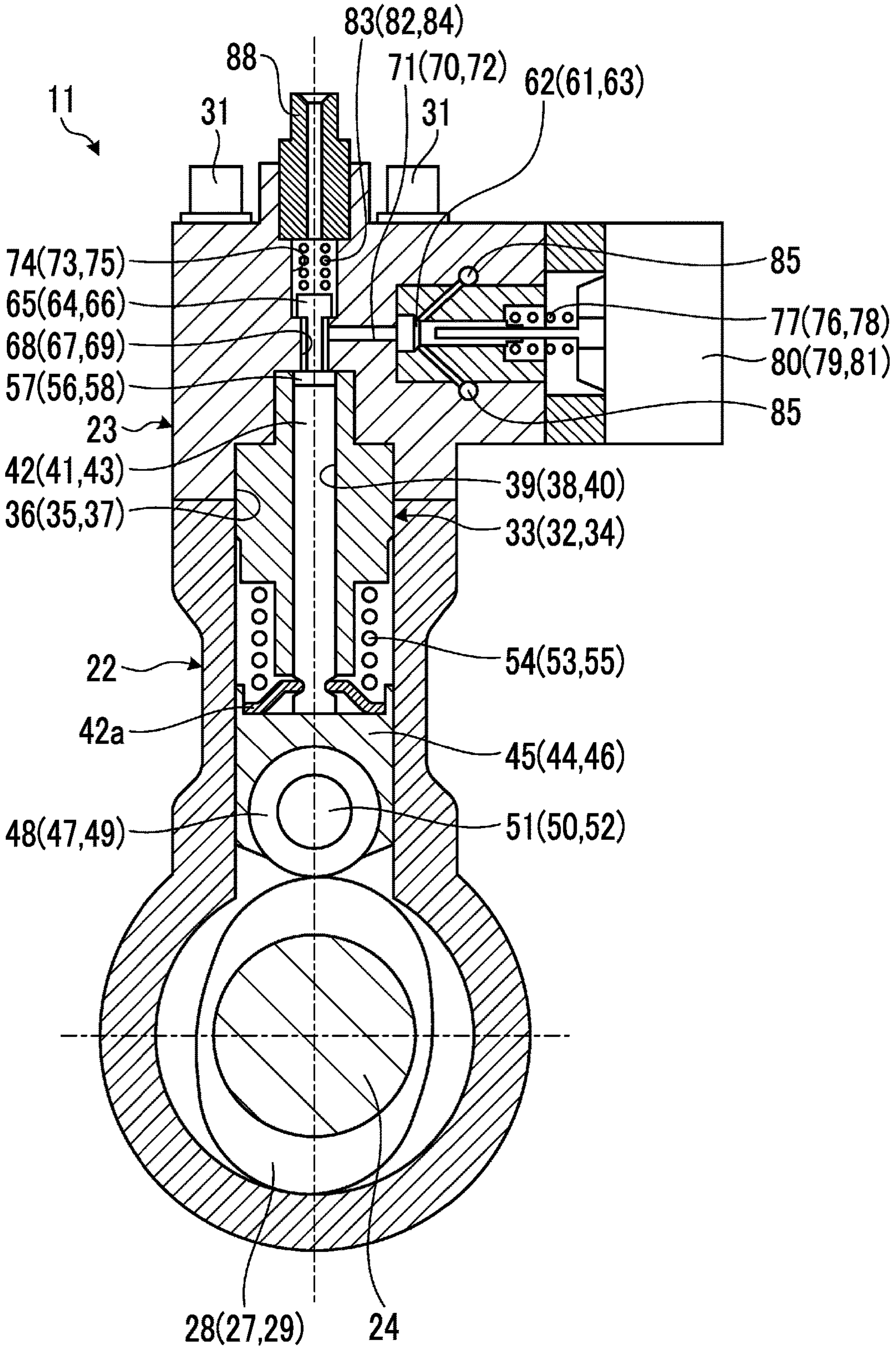
FIG. 3 is a sectional view taken along a III-III line of FIG. 2 illustrating a vertical section of the fuel pump.

FIG. 2 is a vertical sectional view illustrating the fuel pump of the present embodiment, and FIG. 3 is a sectional view taken along a III-III line of FIG. 2 illustrating a vertical section of the fuel pump. The fuel pump to be described below has a type in which three plungers are disposed. On the other hand, the number of the plungers is not limited thereto.

As illustrated in FIG. 2 and FIG. 3, a housing of the fuel pump 11 is configured by bolt-fastening a retainer 21, a pump casing 22, and a pump head 23. A cam shaft 24 is disposed inside the pump casing 22. Each end portion of the cam shaft 24 in an axial direction is rotatably supported by the retainer 21 by bearings 25 and 26. One end portion of the cam shaft 24 in the axial direction protrudes to the outside of the retainer 21, and a driving force is input from the diesel engine. In the cam shaft 24, a plurality of (in the present embodiment, three) cams 27, 28, and 29 are provided at intervals in the axial direction. The cams 27, 28, and 29 have different phases in a circumferential direction.

The retainer 21 is fastened to the pump casing 22 by a plurality of bolts 30. The plurality of bolts 30 penetrate the retainer 21, and tip portions of the plurality of bolts 30 are screwed to the pump casing 22. The pump head 23 is fastened to the pump casing 22 by a plurality of bolts 31. The plurality of bolts 31 penetrate the pump head 23, and are screwed into the pump casing 22.

Three plunger barrels 32, 33, and 34 are disposed inside the pump casing 22 and the pump head 23. Each of the plunger barrels 32, 33, and 34 has the same configuration. The pump casing 22 and the pump head 23 are provided with three accommodation holes 35, 36, and 37 along a direction orthogonal to the axial direction of the cam shaft 24. The accommodation holes 35, 36, and 37 are formed across the pump casing 22 and the pump head 23. Each of the plunger barrels 32, 33, and 34 is disposed in each of the accommodation holes 35, 36, and 37. That is, the plunger barrels 32, 33, and 34 respectively includes first shaft portions 32*a*, 33*a*, and 34*a*, second shaft portions 32*b*, 33*b*, and 34*b*, and third shaft portions 32*c*, 33*c*, and 34*c*, and fourth shaft portions 32*d*, 33*d*, and 34*d* along the axial direction. Outer diameters of the plunger barrels 32, 33, and 34 decrease in order of the second shaft portions 32*b*, 33*b*, and 34*b*, the third shaft portions 32*c*, 33*c*, and 34*c*, the first shaft portions 32*a*, 33*a*, and 34*a*, and the fourth shaft portions 32*d*, 33*d*, and 34*d*. On the other hand, the accommodation holes 35, 36, and 37 include first holes 35*a*, 36*a*, and 37*a*, and second holes 35*b*, 36*b*, and 37*b*. In the plunger barrels 32, 33, and 34, the first shaft portions 32*a*, 33*a*, and 34*a* are supported by the first holes 35*a*, 36*a*, and 37*a* of the accommodation holes 35, 36, and 37, and the second shaft portions 32*b*, 33*b*, and 34*b* are supported by the second holes 35*b*, 36*b*, and 37*b*.

Support holes 38, 39, and 40 are respectively formed inside the plunger barrels 32, 33, and 34 along the axial direction. The support holes 38, 39, and 40 respectively penetrate the plunger barrels 32, 33, and 34 in the axial direction. In the plunger barrels 32, 33, and 34, plungers 41, 42, and 43 are respectively disposed in the support holes 38, 39, and 40. Each of the plungers 41, 42, and 43 is movably supported along the axial direction in each of the support holes 38, 39, and 40 of the plunger barrels 32, 33, and 34.

Tappets 44, 45, and 46 and rollers 47, 48, and 49 are respectively disposed between the plungers 41, 42, and 43 and the cams 27, 28, and 29. The rollers 47, 48, and 49 are rotatably supported by the tappets 44, 45, and 46 by using supporting shafts 50, 51, and 52. In the plungers 41, 42, and 43, spring seats 41*a*, 42*a*, and 43*a* are disposed at lower end portions in the axial direction. Compression coil springs 53, 54, and 55 are disposed between the plunger barrels 32, 33, and 34 and the spring seats 41*a*, 42*a*, and 43*a*. The compression coil springs 53, 54, and 55 press the plungers 41, 42, and 43 against the tappets 44, 45, and 46 by an energizing force acting on the spring seats 41*a*, 42*a*, and 43*a*, and the rollers 47, 48, and 49 are pressed against the cams 27, 28, and 29 via the tappets 44, 45, and 46. Outer peripheral surfaces of the rollers 47, 48, and 49 come into contact with outer peripheral surfaces of the cams 27, 28, and 29.

In the plunger barrels 32, 33, and 34, pressurization chambers 56, 57, and 58 are formed in the support holes 38, 39, and 40 on one end portion side in the axial direction. The pressurization chambers 56, 57, and 58 are partitioned by inner peripheral surfaces of the support holes 38, 39, and 40, end surfaces of the plungers 41, 42, and 43 on one end portion side in the axial direction, end surfaces of discharge valves 64, 65, and 66 to be described later, and end surfaces of suction valves 61, 62, and 63 to be described later. The plungers 41, 42, and 43 move the support holes 38, 39, and 40 to the one end portion side in the axial direction, and thus the fuel inhaled into the pressurization chambers 56, 57, and 58 can be pressurized.

In the pump head 23, suction valves 61, 62, and 63 and discharge valves 64, 65, and 66 are disposed. In the pump head 23, fuel channels 67, 68, and 69 that respectively communicate with the support holes 38, 39, and 40 of the plunger barrels 32, 33, and 34 are provided. The fuel channels 67, 68, and 69 are disposed in a straight line with the support holes 38, 39, and 40. One end portions of the fuel channels 67, 68, and 69 communicate with the support holes 38, 39, and 40. One end portions of suction channels (fuel suction channels) 70, 71, and 72 communicate with middle portions of the fuel channels 67, 68, and 69. One end portions of discharge channels (fuel discharge channels) 73, 74, and 75 communicate with the other end portions of the fuel channels 67, 68, and 69. The suction channels 70, 71, and 72 are provided in a direction orthogonal to the fuel channels 67, 68, and 69. The fuel channels 67, 68, and 69 are also used as a part of the fuel suction channels and the fuel discharge channels.

In the suction channels 70, 71, and 72, the suction valves 61, 62, and 63 are disposed. The suction valves 61, 62, and 63 are energized by the compression coil springs 76, 77, and 78 in a direction to open the suction channels 70, 71, and 72, and are operated to close the suction channels 70, 71, and 72 by the actuators 79, 80, and 81. The discharge valves 64, 65, and 66 are disposed in the discharge channels 73, 74, and 75. The discharge valves 64, 65, and 66 are energized by compression coil springs 82, 83, and 84 in a direction to close the discharge channels 73, 74, and 75, and are operated to open the discharge channels 73, 74, and 75 by the fuel pressure. In this case, the pressurization chambers 56, 57, and 58 communicate with the fuel channels 67, 68, and 69 and the suction channels 70, 71, and 72.

The three suction channels 70, 71, and 72 communicate with each other via communication channels 85. The fuel line L11 from the fuel tank 14 (both refer to FIG. 1) is connected to the communication channel 85. Plugs 86 and 87 are mounted to the other end portions of the discharge channels 73 and 75, and close the discharge channels 73 and 75. A connector 88 is mounted to the other end portion of the discharge channel 74. In addition, the three discharge channels 73, 74, and 75 are communicated with each other by the communication channel 89. The common rail 12 (both refer to FIG. 1) is connected to the connector 88 via the high-pressure fuel line L12. The communication channel 89 allows the discharge channels 73, 74, and 75 to communicates with each other. On the other hand, the communication channel 89 may be disposed in a linear shape to intersect with the discharge channels 73, 74, and 75, and may directly communicate with the discharge channels 73, 74, and 75. Alternatively, the communication channel 89 may be disposed with an offset in a direction perpendicular to the paper surface of FIG. 2, and may indirectly communicate with the discharge channels 73, 74, and 75.

Therefore, when the cam shaft 24 rotates, a rotational force is converted into a reciprocating force by the cams 27, 28, and 29, and the converted force is transmitted to the rollers 47, 48, and 49 and the tappets 44, 45, and 46. Due to the movement of the rollers 47, 48, and 49 and the tappets 44, 45, and 46, the plungers 41, 42, and 43 reciprocate along the axial direction in the support holes 38, 39, and 40 of the plunger barrels 32, 33, and 34. When the suction valves 61, 62, and 63 open the suction channels 70, 71, and 72 and the plungers 41, 42, and 43 move to the other side in the axial direction (a lower side in FIG. 2 and FIG. 3), the low-pressure fuel in the communication channel 85 is inhaled into the pressurization chambers 56, 57, and 58 via the suction channels 70, 71, and 72 and the fuel channels 67, 68, and 69. When the plungers 41, 42, and 43 reach a bottom dead point, in a step in which the plungers 41, 42, and 43 head toward a top dead point, in a case where the actuators 79, 80, and 81 are operated, the suction valves 61, 62, and 63 move against the energizing force of the compression coil springs 76, 77, and 78, and close the suction channels 70, 71, and 72.

In a state where the low-pressure fuel is inhaled into the pressurization chambers 56, 57, and 58, when the plungers 41, 42, and 43 move to one side in the axial direction (upper side in FIG. 2 and FIG. 3), before the actuators 79, 80, and 81 are operated, the low-pressure fuel is returned from the suction channels 70, 71, and 72 to the communication channel 85 via the suction valves 61, 62, and 63. After the actuators 79, 80, and 81 are operated, the low-pressure fuel is closed by the suction valves 61, 62, and 63, and volumes of the pressurization chambers 56, 57, and 58 are reduced. Thus, the low-pressure fuel in the pressurization chambers 56, 57, and 58 is pressurized. When the low-pressure fuel in the pressurization chambers 56, 57, and 58 is pressurized to a predetermined pressure, the discharge valves 64, 65, and 66 move against the energizing force of the compression coil springs 82, 83, and 84 and the pressure received from the common rail 12, and open the discharge channels 73, 74, and 75. Then, the high-pressure fuel in the pressurization chambers 56, 57, and 58 is discharged from the fuel channels 67, 68, and 69 to the discharge channels 73, 74, and 75. In addition, the high-pressure fuel in the discharge channels 73, 74, and 75 is joined at the communication channel 89, and is discharged from the connector 88 to the high-pressure fuel line L12 (refer to FIG. 1). Thereafter, when the plungers 41, 42, and 43 reach the top dead point, discharge of the high-pressure fuel is ended. When the plungers 41, 42, and 43 start to move to the other side in the axial direction, the volumes of the pressurization chambers 56, 57, and 58 are increased, and thus, the pressure in the pressurization chambers 56, 57, and 58 decreases. The discharge valves 64, 65, and 66 move due to the energizing force of the compression coil springs 82, 83, and 84 and the pressure received from the common rail 12, and close the discharge channels 73, 74, and 75.

<Mounting Structure of Plunger Barrel>

Figure 4:
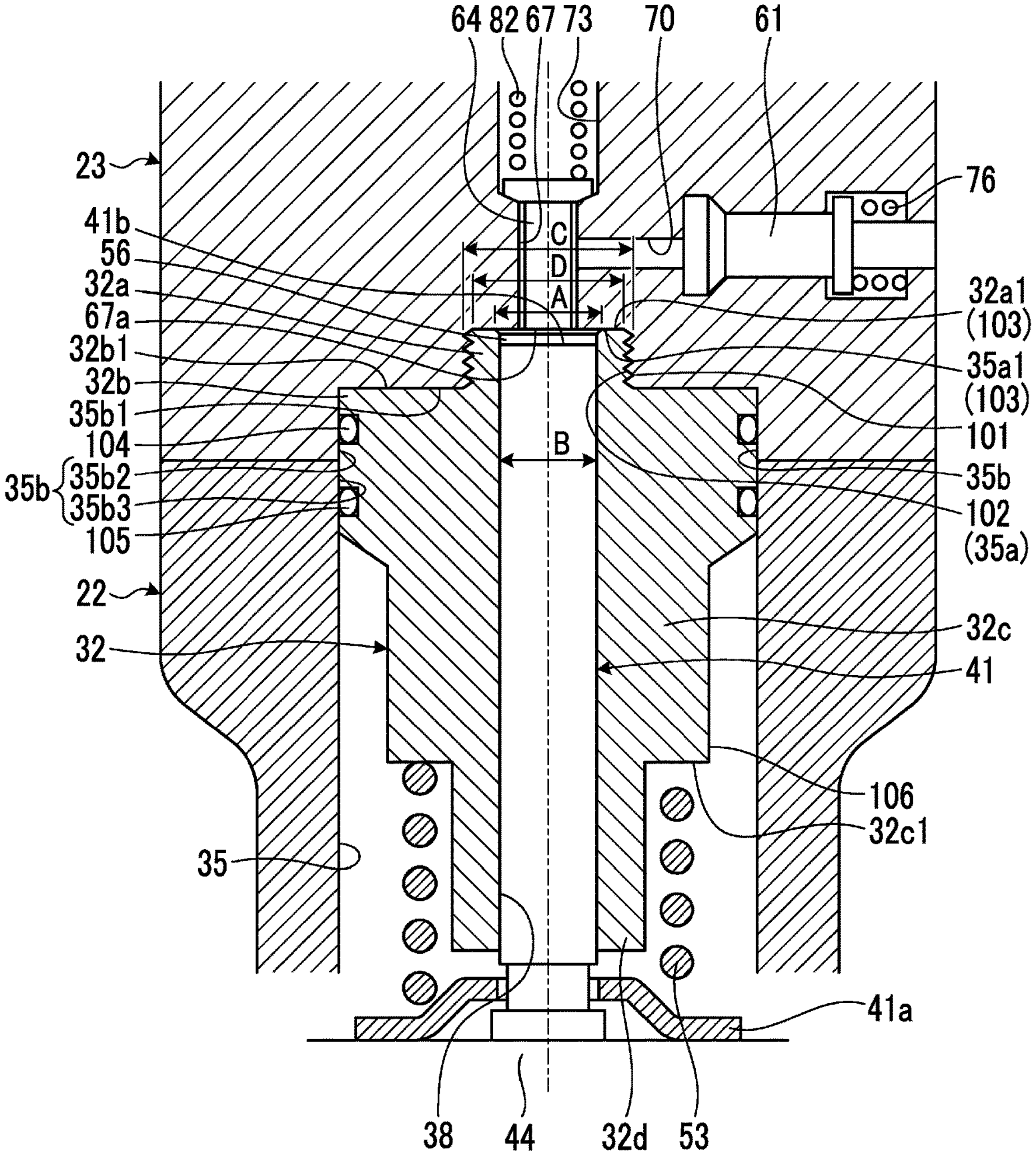
FIG. 4 is an enlarged view illustrating a mounting structure of a plunger barrel.

FIG. 4 is an enlarged view illustrating a mounting structure of the plunger barrel. Since each of the plunger barrels 32, 33, and 34 has substantially the same configuration, only the plunger barrel 32 will be described.

As illustrated in FIG. 4, the pump casing 22 and the pump head 23 are provided with accommodation holes 35 inside, the plunger barrel 32 is supported by the accommodation hole 35, and one end portion of the plunger barrel 32 in the axial direction is screwed to the pump head 23. That is, in the plunger barrel 32, a male thread portion 101 is formed on an outer peripheral portion of the first shaft portion (small diameter portion) 32*a*. On the other hand, in the pump head 23, a female thread portion 102 is formed in an inner peripheral portion of the first hole 35*a*. In the plunger barrel 32, the male thread portion 101 of the first shaft portion 32*a* is screwed into the female thread portion 102 of the first hole 35*a* in the pump head 23, and thus the plunger barrel 32 is screwed to the pump head 23.

Support hole 38 is formed in the plunger barrel 32, and the plunger 41 is movably supported by the support hole 38. The pump head 23 is provided with a fuel channel 67, and communicates with the support hole 38. The fuel channel 67 communicates with the suction channel 70, and communicates with the discharge channel 73. A suction valve 61 (refer to FIG. 3) is disposed in the suction channel 70, and a discharge valve 64 is disposed in the fuel channel 67 and the discharge channel 73. In this case, the discharge channel 73 is disposed in a straight line with respect to the support hole 38, and the suction channel 70 is disposed along a direction orthogonal to the fuel channel 67 and the discharge channel 73. In addition, the support hole 38, the pressurization chamber 56, the fuel channel 67, and the discharge channel 73 communicate with each other, and the suction channel 70 communicates with the pressurization chamber 56 via the fuel channel 67.

The pressurization chamber 56 is configured to be partitioned by an inner peripheral surface of the support hole 38, an end surface 41*b* of the plunger 41, and an end surface 64*a* of the discharge valve 64. Since the one end portion of the plunger barrel 32 is screwed to the pump head 23, an end surface 32*a*1 of the first shaft portion 32*a* comes into close contact with an end surface 35*a*1 of the first hole 35*a* of the pump head 23, and a sealing portion 103 is configured between the end surface 32*a*1 of the first shaft portion 32*a* and the end surface 35*a*1 of the first hole 35*a*. At this time, a minute gap is formed between the end surface 32*b*1 of the second shaft portion 32*b* and the end surface 35*b*1 of the second hole 35*b*, and thus the end surface 32*a*1 of the first shaft portion 32*a* and the end surface 35*a*1 of the first hole 35*a* are always pressed against each other. Thereby, sealing performance is ensured.

Here, the sealing portion 103 and the support hole 38 form a concentric circle shape. In addition, an inner diameter of the sealing portion 103 is larger than an inner diameter of the support hole 38 (an outer diameter of the plunger 41). Further, an outer diameter of the male thread portion 101 of the plunger barrel 32 is set to be larger than an outer diameter of the sealing portion 103 and in a range of 1.8 times to 2.3 times the inner diameter of the sealing portion 103.

The plunger barrel 32 is mounted with two O-rings 104 and 105 on the outer peripheral portion of the second shaft portion 32*b* at intervals in the axial direction. In the plunger barrel 32, the second shaft portion 32*b* is fitted into the second hole 35*b*2 of the pump head 23 via the O-ring 104, and the second shaft portion 32*b* is fitted into the second hole 35*b*3 of the pump casing 22 via the O-ring 105.

The plunger barrel 32 is provided with an engagement portion 106 that allows a fastening tool (not illustrated) to engage with the third shaft portion 32*c* so as to rotate the plunger barrel 32. For example, in a case where the fastening tool is a hexagonal spanner, a hexagonal wrench, or the like, the engagement portion 106 has a hexagonal column shape. In addition, by allowing the fastening tool to engage with the engagement portion 106 and rotating the plunger barrel 32, the male thread portion 101 of the plunger barrel 32 can be screwed to the female thread portion 102 of the pump head 23. The shape of the engagement portion 106 is not limited to the hexagonal column shape, and may be appropriately set according to a type of the fastening tool.

The compression coil spring 53 is disposed between the plunger barrel 32 and the tappet 44. The compression coil spring 53 energizes the plunger 41 to the cam 27 side (refer to FIG. 2 and FIG. 3) via the tappet 44 by the energizing force. In the plunger barrel 32, a spring receiving portion 32*cl* formed on the end surface of the third shaft portion 32*c* on which the engagement portion 106 is formed is formed. One end portion of the compression coil spring 53 in the axial direction is brought into contact with the spring receiving portion 32*cl* of the plunger barrel 32.

Further, as illustrated in FIG. 2, the plurality of plunger barrels 32, 33, and 34 are disposed at intervals in the pump head 23 and the pump casing 22. At this time, pitches P of the plurality of plunger barrels 32, 33, and 34 are set in a range of 5 times to 6 times the inner diameter B (refer to FIG. 4) of the support holes 38, 39, and 40.

Therefore, by screwing one end portion of the plunger barrel 32 in the axial direction to the pump head 23, a plurality of bolts for fastening the plunger barrel 32 to the pump head 23 are not required, and the outer diameter of the plunger barrel 32 does not increase.

[Actions and Effects of Present Embodiment]

The fuel pump according to a first aspect includes the pump head 23, the plunger barrels 32, 33, and 34 which are provided with the support holes 38, 39, and 40 and in which one end portion sides of the support holes 38, 39, and 40 in the axial direction are screwed to the pump head 23, the plungers 41, 42, and 43 which are movably supported in the support holes 38, 39, and 40 along the axial direction, the pressurization chambers 56, 57, and 58 partitioned by one end portions of the support holes 38, 39, and 40 and one end portions of the plungers 41, 42, and 43, the discharge channels (fuel discharge channels) 73, 74, and 75 of which the one end portions communicate with the pressurization chambers 56, 57, and 58, and the suction channels (fuel suction channels) 70, 71, and 72 of which the one end portions communicate with the pressurization chambers 56, 57, and 58.

With the fuel pump according to the first aspect, the one end portions of the plunger barrels 32, 33, and 34 in the axial direction are screwed to the pump head 23. Thereby, a plurality of bolts for fastening the plunger barrels 32, 33, and 34 to the pump head 23 are not required, and the bolts do not interfere with other fixing bolts. Therefore, the outer diameters of the plunger barrels 32, 33, and 34 do not increase, and the diameters of the plunger barrels 32, 33, and 34 can be reduced. Thereby, it is possible to reduce a size of the fuel pump 11. Further, the plunger barrel 32 is not deformed due to non-uniformity of the fastening force of the bolts for fastening the plunger barrels 32, 33, and 34, and a decrease in the roundness on one end portion sides of the support holes 38, 39, and 40 can be suppressed.

In the fuel pump according to a second aspect, the suction channels 70, 71, and 72 communicate with the pressurization chambers 56, 57, and 58 via the fuel channels (fuel discharge channels) 67, 68, and 69. Thereby, only the fuel channels 67, 68, and 69 communicate with the pressurization chambers 56, 57, and 58, and thus inner diameters of the support holes 38, 39, and 40 of the pressurization chambers 56, 57, and 58 can be reduced.

In the fuel pump according to a third aspect, the discharge channels 73, 74, and 75 are disposed in a straight line with respect to the support holes 38, 39, and 40, and the suction channels 70, 71, and 72 are disposed along a direction orthogonal to the fuel channels 67, 68, and 69. Thereby, the high-pressure fuel can be discharged in a straight line from the pressurization chambers 56, 57, and 58, and the high-pressure fuel can be efficiently discharged.

In the fuel pump according to a fourth aspect, the plunger barrels 32, 33, and 34 include the first shaft portions (small diameter portions) 32*a*, 33*a*, and 34*a* and the second shaft portions (large diameter portions) 32*b*, 33*b*, and 34*b* provided on the other end portion sides in the axial direction from the first shaft portions 32*a*, 33*a*, and 34*a*. The male thread portion 101 is formed on the outer peripheral portions of the first shaft portions 32*a*, 33*a*, and 34*a*. The pump head 23 is provided with the accommodation hole 35, and the female thread portion 102 is formed on the inner peripheral surfaces of the first holes 35*a*, 36*a*, and 37*a*. The plunger barrels 32, 33, and 34 are screwed to the pump head 23 by allowing the male thread portion 101 to be screwed into the female thread portion 102. The ring-shaped sealing portion 103 is formed between the end surfaces of the first shaft portions 32*a*, 33*a*, and 34*a* and the end surfaces of the accommodation holes 35, 36, and 37, and the inner diameter of the sealing portion 103 is larger than the inner diameters of the support holes 38, 39, and 40. Thereby, high sealing performance in the sealing portion 103 can be ensured.

In the fuel pump according to a fifth aspect, the sealing portion 103 and the support holes 38, 39, and 40 form a concentric circle shape. Thereby, the sealing portion 103 and the support holes 38, 39, and 40 can be processed with high accuracy.

In the fuel pump according to a sixth aspect, the outer diameter of the male thread portion 101 is set to be larger than the outer diameter of the sealing portion 103, and is set in a range of 1.8 times to 2.3 times the inner diameter of the sealing portion 103. Thereby, high sealing performance in the sealing portion 103 can be ensured, and sufficient fastening force of the plunger barrels 32, 33, and 34 by the male thread portion 101 can be ensured.

In the fuel pump according to a seventh aspect, the accommodation hole 35 is provided with the first holes 35*a*, 36*a*, and 37*a* in which the female thread portion 102 is formed on the inner peripheral surface and the second holes 35*b*, 36*b*, and 37*b* having a diameter larger than the diameter of the first holes 35*a*, 36*a*, and 37*a*. In the plunger barrels 32, 33, and 34, the outer peripheral portions of the second shaft portions 32*b*, 33*b*, and 34*b* are fitted into the inner peripheral surfaces of the second holes 35*b*, 36*b*, and 37*b* via the O-ring 104. Thereby, fuel leakage from the pressurization chambers 56, 57, and 58 can be suppressed.

In the fuel pump according to an eighth aspect, the plunger barrels 32, 33, and 34 are provided with an engagement portion 106 that engages with a fastening tool on the other end portion side in the axial direction so as to rotate the plunger barrels 32, 33, and 34. Thereby, the plunger barrels 32, 33, and 34 can be easily fastened to the pump head by using an existing tool.

In the fuel pump according to a ninth aspect, the compression coil springs (energizing members) 53, 54, and 55 for energizing the plungers 41, 42, and 43 in a direction to press the plungers 41, 42, and 43 against the cams are disposed outside the plunger barrels 32, 33, and 34 in a radial direction. The spring receiving portions (energizing members) of the compression coil springs 53, 54, and 55 are provided on the end surface of the engagement portion 106. Thereby, the compression coil springs 53, 54, and 55 can be easily assembled.

In the fuel pump according to a tenth aspect, the plurality of plunger barrels 32, 33, and 34 are disposed on the pump head 23 at intervals, and the pitches of the plurality of plunger barrels 32, 33, and 34 are set in a range of 5 times to 6 times the inner diameter of the support holes 38, 39, and 40. Thereby, the plurality of plunger barrels 32, 33, and 34 can be disposed at an appropriate pitch.

In the above-described embodiment, the support holes 38, 39, and 40 have the same diameter in the axial direction, and one end portions of the support holes 38, 39, and 40 communicate with the fuel channels 67, 68, and 69. On the other hand, the present disclosure is not limited to the configuration. For example, the support hole may be configured with a main body hole having the same diameter as the support holes 38, 39, and 40 and a small diameter portion having a diameter smaller than the diameter of the support holes 38, 39, and 40, and the small diameter portion may communicate with the fuel channels 67, 68, and 69. In this case, the plungers 41, 42, and 43 are movably supported only by the main body holes.

Further, a form of the fuel injection device 10 and a form of the fuel pump 11 are not limited to the above-described embodiment. For example, the number of the common rails 12 and the fuel injectors 13, the connection position of the fuel pump 11, the number of the plungers 41, 42, and 43, and the plunger barrels 32, 33, and 34 may be appropriately set.

REFERENCE SIGNS LIST

10: fuel injection device
11: fuel pump
12: common rail
13: fuel injector
14: fuel tank
21: retainer
22: pump casing
23: pump head
24: cam shaft
25, 26: bearing
27, 28, 29: cam
30, 31: bolt
32, 33, 34: plunger barrel
35, 36, 37 accommodation hole
38, 39, 40: support hole
41, 42, 43: plunger
44, 45, 46: tappet
47, 48, 49: roller
50, 51, 52: supporting shaft
53, 54, 55: compression coil spring (energizing member)
61, 62, 63: suction valve
64, 65, 66: discharge valve
67, 68, 69: fuel channel
70, 71, 72: suction channel
73, 74, 75: discharge channel
76, 77, 78: compression coil spring
79, 80, 81: actuator
82, 83, 84: compression coil spring
85: communication channel
86, 87: plug
88: connector
89: communication channel
101: male thread portion
102: female thread portion
103: sealing portion
104, 105: O-ring
106: engagement portion
L11: fuel line
L12: high-pressure fuel line
L13: fuel supply line

The invention claimed is:

1. A fuel pump comprising:
a pump head;
a plunger barrel that is provided with a support hole and in which one end portion side of the support hole in an axial direction is screwed to the pump head;
a plunger that is supported by the support hole so as to be movable along the axial direction;
a pressurization chamber partitioned by one end portion of the support hole and one end portion of the plunger;
a fuel channel of which one end portion communicates with the pressurization chamber and an other end portion communicates with a discharge channel;
a suction channel of which one end portion communicates with the fuel channel; and
a discharge valve having a first portion provided within the discharge channel, and a second portion extending from the first portion and provided within the fuel channel,
wherein
the fuel channel and the suction channel communicate with each other at an intersection point where they intersect with each other,
the fuel channel extends in a first direction,
the suction channel extends in a second direction intersecting the first direction, and
the second portion extends in the first direction from a base of the first portion to the intersection point in the fuel channel,
the discharge valve closes when a pressure in the pressurized chamber is less than a predetermined pressure, and disconnects the discharge channel and the fuel channel;
the discharge valve opens when the pressure in the pressurized chamber exceeds the predetermined pressure, and connects the discharge channel and the fuel channel.

2. The fuel pump according to claim 1, wherein
the fuel channel is disposed in a straight line with respect to the support hole, and
the suction channel is disposed along a direction orthogonal to the fuel discharge channel.

3. The fuel pump according to claim 2, wherein
the plunger barrel includes a small diameter portion and a large diameter portion provided on the other end portion side in the axial direction from the small diameter portion,
a male thread portion is formed on an outer peripheral portion of the small diameter portion,
the pump head is provided with one or more accommodation holes,
a female thread portion is formed on an inner peripheral surface of the one or more accommodation holes, the plunger barrel is screwed to the pump head by allowing the male thread portion to be screwed into the female thread portion, a ring-shaped sealing portion is formed between an end surface of the small diameter portion and an end surface of the one or more accommodation holes, and an inner diameter of the sealing portion is larger than an inner diameter of the support hole.

4. The fuel pump according to claim 2, wherein the plunger barrel is provided with an engagement portion that engages with a fastening tool on the other end portion side in the axial direction so as to rotate the plunger barrel.

5. The fuel pump according to claim 1, wherein the plunger barrel includes a small diameter portion and a large diameter portion provided on the other end portion side in the axial direction from the small diameter portion, a male thread portion is formed on an outer peripheral portion of the small diameter portion, the pump head is provided with one or more accommodation holes, a female thread portion is formed on an inner peripheral surface of the one or more accommodation holes, the plunger barrel is screwed to the pump head by allowing the male thread portion to be screwed into the female thread portion, a ring-shaped sealing portion is formed between an end surface of the small diameter portion and an end surface of the one or more accommodation holes, and an inner diameter of the sealing portion is larger than an inner diameter of the support hole.

6. The fuel pump according to claim 5, wherein the sealing portion and the support hole form a concentric circle shape.

7. The fuel pump according to claim 6, wherein an outer diameter of the male thread portion is set to be larger than an outer diameter of the sealing portion, and is set in a range of 1.8 times to 2.3 times the inner diameter of the sealing portion.

8. The fuel pump according to claim 6, wherein the one or more accommodation holes include a first hole in which the female thread portion is formed on an inner peripheral surface and a second hole having a diameter larger than a diameter of the first hole, and an outer peripheral portion of the large diameter portion of the plunger barrel is fitted into an inner peripheral surface of the second hole via an O-ring.

9. The fuel pump according to claim 6, wherein the plunger barrel is provided with an engagement portion that engages with a fastening tool on the other end portion side in the axial direction so as to rotate the plunger barrel.

10. The fuel pump according to claim 5, wherein an outer diameter of the male thread portion is set to be larger than an outer diameter of the sealing portion, and is set in a range of 1.8 times to 2.3 times the inner diameter of the sealing portion.

11. The fuel pump according to claim 10, wherein the one or more accommodation holes include a first hole in which the female thread portion is formed on an inner peripheral surface and a second hole having a diameter larger than a diameter of the first hole, and an outer peripheral portion of the large diameter portion of the plunger barrel is fitted into an inner peripheral surface of the second hole via an O-ring.

12. The fuel pump according to claim 10, wherein the plunger barrel is provided with an engagement portion that engages with a fastening tool on the other end portion side in the axial direction so as to rotate the plunger barrel.

13. The fuel pump according to claim 5, wherein the one or more accommodation holes include a first hole in which the female thread portion is formed on an inner peripheral surface and a second hole having a diameter larger than a diameter of the first hole, and an outer peripheral portion of the large diameter portion of the plunger barrel is fitted into an inner peripheral surface of the second hole via an O-ring.

14. The fuel pump according to claim 5, wherein the plunger barrel is provided with an engagement portion that engages with a fastening tool on the other end portion side in the axial direction so as to rotate the plunger barrel.

15. The fuel pump according to claim 1, wherein the plunger barrel is provided with an engagement portion that engages with a fastening tool on the other end portion side in the axial direction so as to rotate the plunger barrel.

16. The fuel pump according to claim 15, wherein one or more compression coil springs that energizes the plunger in a direction to press the plunger against a cam is disposed outside the plunger barrel in a radial direction, and a spring receiving portion of the energizing member is provided on an end surface of the engagement portion.

17. The fuel pump according to claim 1, wherein the plunger barrel is one of a plurality of the plunger barrels that are disposed on the pump head at intervals, and pitches of the plurality of the plunger barrels are set in a range of 5 times to 6 times the inner diameter of the support hole.

* * * * *